United States Patent Office 3,094,506
Patented June 18, 1963

3,094,506
NOVEL COMPOUNDS AND POLYMERIC HALOGEN-CONTAINING RESINS INCORPORATING SAME
Alan E. Weinberg, Verona, and Richard J. Bellet, Mountain Lakes, N.J., assignors to Hooker Chemical Corporation, Niagara Falls, N.Y., a corporation of New York
No Drawing. Filed July 27, 1959, Ser. No. 829,503
8 Claims. (Cl. 260—45.8)

This invention relates to new and unique stabilizers for polymeric halogen-containing resins, which stabilizers enhance the resistance of the resins to degradation brought about by either heat or light.

One of the chief problems connected with attempts to improve weathering characteristics of polymeric halogen-containing resins is the adverse effect upon the physical properties of such resins when conventional stabilizers are added thereto. It has, for example, been noticed that when conventional or prior art heat and light stabilizers have been added to such resins, the heat distortion point of such resins is greatly lowered.

Halogen-containing resins such as vinyl chloride or vinylidene chloride or polyesters containing halogens have found extremely wide commercial acceptance such as in making films and laminates, molding compounds, etc. With such wide commercial use have come the accompanying necessities that the materials withstand various physical conditions, such as relatively high and low temperatures and possess stability to light and resistance to solvents, etc. However, such necessities have not always been realized as ideally as desired and this is particularly true of the heat and light stability of such resins, that is to say, of the resistance of such resins to degradation brought about by either heat or light.

It is an object therefore, of this invention to synthesize new and useful stabilizers for polymeric halogen-containing resins.

It is a further object of this invention to provide such stabilizers as will greatly improve the heat and light stability of polymeric halogen-containing resins. It is yet another object of this invention to accomplish such improved stabilities without the impairment of other desired and necessary qualities of such resins.

We have found that by reacting a benzophenone having hydroxyl substituents at least in the 2 and 4 positions such as 2,4-dihydroxybenzophenone with an epihalohydrin such as epichlorohydrin, reaction products are obtained which will accomplish all of the foregoing objectives and satisfy the above referred to necessary characteristics for satisfactory polymeric halogen-containing resins.

The benzophenone-epihalohydrin reaction products of this invention may be either physically admixed with the resins to which they are added or they may, for example, be cooked into polyesters at the end of the polyesterification, thereby reducing the acid number, and also yielding a polyester with a built-in light stabilizer.

Examples of polymeric halogen-containing resins embraced within the teachings of this invention are: polyvinyl chloride, polyvinylidene chloride, polyesters derived or based upon dienophilic adducts of hexahalocyclopentadienes, and polyesters based upon tetrachlorophthalic anhydride.

It is a well known fact that degradation of halogen-containing polymers such as those mentioned above is accompanied by the evolution of hydrogen halide. The epoxy-benzophenones of this invention serve the dual purpose of being good ultraviolet light stabilizers and also at the same time good hydrogen halide scavengers.

Typical benzophenones which may be reacted with an epihalohydrin such as epichlorohydrin to yield the reaction products embraced within the teachings of this invention are: 2,4-dihydroxybenzophenone; 2,2',4,4'-tetrahydroxybenzophenone; 2,4-dichloro-2',4'-dihydroxybenzophenone; 2,2',4-trihydroxybenzophenone; 2,4-dihydroxy-4'-methylbenzophenone; 2,4-dihydroxy-4'-alkylbenzophenone; 2,4-dihydroxy-4'-methoxybenzophenone; etc.

Typical of the reaction products embraced within the teachings of this invention are: 2-hydroxy-4(2,3-epoxypropoxy)benzophenone; 2,2'-dihydroxy-4(2,3-epoxypropoxy)benzophenone; 2 - hydroxy - 2',4' - dichloro - 4(2,3-epoxypropoxy)benzophenone; 2-hydroxy-4'-methyl-4(2,3-epoxypropoxy)benzophenone; 2 - hydroxy - 4' - methoxy-4(2,3-epoxypropoxy)benzophenone; etc.

Example 1 illustrates a typical preparation of a reaction product of this invention.

EXAMPLE 1

*The Preparation of 2-Hydroxy-4(2,3-Epoxypropoxy) Benzophenone*

21.4 grams of 2,4-dihydroxybenzophenone was dissolved in a solution of 8 grams of 50 percent sodium hydroxide in 100 ml. water. 40 ml. epichlorohydrin was added and the mixture heated with stirring. After 45 minutes at 60 degrees centigrade, the solution was washed with water to remove salts. The organic solution was dried, then the excess epichlorohydrin removed with water-pump vacuum and moderate heating. In this way 37 grams of amber oil was obtained. Recrystallization from methanol gave 14 grams of pale yellow-crystalline material. The pure product melts at 99–100 degrees centigrade.

Example 2 illustrates an alternative preparation of the product of Example 1 using epibromohydrin instead of epichlorohydrin.

EXAMPLE 2

*The Preparation of 2-Hydroxy-4(2,3-Epoxypropoxy) Benzophenone*

To 8.3 grams of 96 percent sodium hydroxide dissolved in 200 ml. of water was added 42.8 grams of 2,4-dihydroxybenzophenone. To this solution was added 68.5 grams of epibromohydrin. The reaction was carried out in the same manner as in Example 1.

During the work-up of the product, 39.3 grams of epibromohydrin was recovered unreacted. 51.0 grams of product having a melting point of 97–98 degrees centigrade, was recovered. The recrystallization yielded 46.9 grams of pale yellow crystals having a melting point of 99–100 degrees centigrade. This material was shown to be identical to the material from Example 1 by comparison of their infra-red spectra and by the fact that no depression was observed in their mixed melting point.

*Analysis.*—Calculated for $C_{16}H_{14}O_4$: C, 71.1%; H, 5.2%. Found: C, 71.2%; H, 5.2%.

EXAMPLE 3

*The Preparation of 2-Hydroxy-4(2,3-Epoxypropoxy)-4'-Methylbenzophenone*

45.7 grams of 2,4-dihydroxy-4'-methylbenzophenone were dissolved in a solution of NaOH (8.0 grams in 200 ml. of water). When solution was complete, 91.3 grams of epichlorohydrin were added and the entire mixture was heated to 60 degrees centigrade and held at that temperature for three-quarters of an hour. After cooling, the flask was washed with 100 ml. of ether-benzene and the acidified (HCl) layers carefully separated. The aqueous layer was reextracted with additional $Et_2O$-benzene. The organic layers were combined and washed with diluted HCl and then distilled $H_2O$. The organic layer was dried with anhydrous $MgSO_4$ and the solvent carefully removed using a steam bath and aspirator.

Excess epichlorohydrin was then removed using a steam bath and an oil pump at 15 mm. Hg. The amber oil obtained was dissolved in 200 ml. of methanol and allowed to stand.

36.7 grams of yellow crystalline product were obtained with a melting point of 88–90 degrees centigrade. After decolorization and recrystallization from methanol, the material melted sharply at 91–92 degrees centigrade. A small sample was recrystallized and dried (2nd recrystallization) in a drying pistol using refluxing methanol. This was sent out for analysis for C and H.

*Analysis.*—Calculated for $C_{17}H_{16}O_4$: C, 71.82%; H, 5.67%. Found: C, 72.10, 71.91%; H, 5.64, 5.61%.

EXAMPLE 4

*The Preparation of 2-Hydroxy-4(2,3-Epoxypropoxy)-2', 4'-Dichlorobenzophenone*

The reaction was carried out as in Example 3. 56.6 grams of 2,4-dihydroxy-2',4'-dichlorobenzophenone, 8.0 grams of NaOH in 200 ml. of water, and 89.6 grams of epichlorohydrin were charged and the workup was identical. The material was recovered from methanol solution after cooling and standing. 42.2 grams of material were obtained having a melting point of 129–134 degrees centigrade. This material when decolorized and recrystallized from hot ethanol, had a melting point of 135–136 degrees centigrade.

*Analysis.*—Calculated for $C_{16}H_{12}O_4Cl_2$: C, 56.66%; H, 3.57%; Cl, 20.91%; epoxy O, 4.72%. Found: C, 56.62, 56.84%; H, 3.68, 3.61%; Cl, 20.45, 20.49%; epoxy O, 4.5, 4.6%.

The following examples will serve to illustrate the use of stabilizers of the present invention and the improvements resulting therefrom.

In order to allow for consistent and uniform results so that comparisons could be made, the following procedure was used for evaluating weather resistance. One-ply polyester glass fiber laminates (Owens-Corning Fiberglas Corporation Mat No. 216B), containing about 30 percent by weight glass and about 70 percent by weight resin, were exposed in Miami, Florida. These panels were exposed by the standard dry land method, that is 45 degrees to the vertical facing south twenty-four hours/day.

EXAMPLE 5

*Resin Preparation*

An unsaturated polyester resin was prepared by esterifying about fifty-three parts of ethylene glycol and ninety parts of diethylene glycol with about three hundred and ninety-five parts of 1,4,5,6,7,7-hexachlorobicyclo-(2.2.1)-5-heptene-2,3-dicarboxylic anhydride (which was prepared by the Diels-Alder reaction of hexachlorocyclopentadiene with maleic anhydride) and about seventy-one parts of maleic anhydride. About thirty parts of styrene and about one hundred parts of product produced by the esterification reaction were mixed together until complete solution was attained to give a clear, substantially colorless solution of liquid polyester resin having a viscosity of about thirty poises at twenty-five degrees centigrade on a Gardner bubble viscometer and having a chlorine content of about thirty percent by weight of the total.

EXAMPLE 6

To one hundred parts of the unsaturated polyester resin prepared in Example 5 was added one part of 2-hydroxy-4(2,3-epoxypropoxy)benzophenone. A glass laminate was prepared in accordance with the aforementioned method and the resulting mixture polymerized, in the presence of a catalyst consisting of about two percent by weight of a mixture containing fifty percent by weight of benzoyl peroxide in tricresyl phosphate, by heating to a temperature of about ninety-five degrees centigrade for about twenty minutes on an open bed hydraulic press and twelve hours at eighty degrees centigrade in a forced draft oven.

The laminate thereby obtained was exposed outdoors for three months in the manner described above in Miami, Florida, after which time the surface showed only slight discoloration and no surface erosion. A control prepared in the same manner but containing no light stabilizer showed marked discoloration and severe surface erosion.

It is to be understood that the invention is not limited to the specific examples which have been offered merely as illustrative and that modifications may be made within the scope of the appended claims without departing from the spirit of the invention.

We claim:

1. Compounds selected from the group consisting of a 2-hydroxy-4(2,3-epoxypropoxy)benzophenone and a 2-hydroxy-4'(2,3-epoxypropoxy)benzophenone, having at least one additional substituent on the phenyl rings selected from the group consisting of methyl, chlorine and methoxy.

2. 2-hydroxy-2',4'-dichloro-4(2,3-epoxypropoxy)benzophenone.

3. 2-hydroxy-4'-methyl-4(2,3-epoxypropoxy)benzophenone.

4. A composition of matter comprising (1) a polyester resin which comprises the esterification product of a polyhydric alcohol and a member selected from the group consisting of tetrachlorophthalic anhydride and the Diels-Alder reaction product of hexahalocyclopentadiene and maleic anhydride, wherein the halogen is selected from the group consisting of chlorine, fluorine, bromine, and mixtures thereof, and (2) a compound selected from the group consisting of a 2-hydroxy-4(2,3-epoxypropoxy) benzophenone and a 2-hydroxy-4'(2,3-epoxypropoxy)benzophenone.

5. A composition of matter comprising (1) a polyester resin which comprises the esterification product of a polyhydric alcohol and the Diels-Alder reaction product of hexachlorocyclopentadiene and maleic anhydride, and (2) a compound selected from the group consisting of a 2-hydroxy-4(2,3-epoxypropoxy)benzophenone and a 2-hydroxy-4'(2,3-epoxypropoxy)benzophenone.

6. The composition of claim 5 wherein the compound (2) is 2-hydroxy-4(2,3-epoxypropoxy)benzophenone.

7. A composition of matter comprising (1) a polyester resin which comprises the esterification product of a polyhydric alcohol and tetrachlorophthalic anhydride, and (2) a compound selected from the group consisting of a 2-hydroxy-4(2,3-epoxypropoxy)benzophenone and a 2-hydroxy-4'(2,3-epoxypropoxy)benzophenone.

8. The composition of claim 7 wherein the compound (2) is 2-hydroxy-4(2,3-epoxypropoxy)benzophenone.

References Cited in the file of this patent

UNITED STATES PATENTS

| | | |
|---|---|---|
| 2,371,500 | Britton et al. | Mar. 13, 1945 |
| 2,669,549 | Darby | Feb. 16, 1954 |
| 2,671,064 | Cowell et al. | Mar. 2, 1954 |
| 2,922,777 | Burgert et al. | Jan. 26, 1960 |

OTHER REFERENCES

Chemistry of Carbon Compounds, E. H. Rodd, vol. 1, Part A, 1951, General Introduction and Aliphatic Compounds, Elsevier Pub. Co., N.Y., chap. 4, section 4, Esters of Mineral Acids, pp. 328 and 329 especially cited.

Paquin et al.: "Epoxyverbindugen und Epoxydharge," 1958, Berlin, page 173.